US012710846B2

(12) United States Patent
Mogi et al.

(10) Patent No.: US 12,710,846 B2
(45) Date of Patent: Aug. 18, 2026

(54) ELECTROSTATIC INPUT DEVICE

(71) Applicant: Alps Alpine Co., Ltd., Tokyo (JP)

(72) Inventors: Takahiro Mogi, Miyagi-ken (JP); Shogo Ujikawa, Miyagi-ken (JP); Satoshi Nakajima, Miyagi-ken (JP); Kohei Kitagawa, Miyagi-ken (JP); Masaya Sugawara, Miyagi-ken (JP); Zhiyuan Chen, Miyagi-ken (JP); Shunichi Watanabe, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 19/084,900

(22) Filed: Mar. 20, 2025

(65) Prior Publication Data

US 2025/0306716 A1 Oct. 2, 2025

(30) Foreign Application Priority Data

Mar. 26, 2024 (JP) ................................. 2024-049230

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05); *G06F 2203/04108* (2013.01)

(58) Field of Classification Search
CPC ......... G06F 2203/04108; G06F 3/0418; G06F 3/04186; G06F 3/044; G06F 3/0446; G06F 3/046
See application file for complete search history.

(56) References Cited

U.S. PATENT DOCUMENTS

2007/0242053 A1 10/2007 Muranaka
2010/0060609 A1* 3/2010 Doi ...................... G06F 3/0445 341/5
2012/0092296 A1 4/2012 Yanase et al.
2014/0043287 A1 2/2014 Nakajima et al.
2014/0062947 A1* 3/2014 Zhou .................. G06F 3/04186 345/174
2015/0002459 A1* 1/2015 Watanabe .......... G06F 3/04186 345/174

(Continued)

FOREIGN PATENT DOCUMENTS

JP 2018-116631 A 7/2018

*Primary Examiner* — Robin J Mishler
(74) *Attorney, Agent, or Firm* — Harness, Dickey & Pierce, P.L.C.

(57) ABSTRACT

An electrostatic input device includes electrostatic sensor electrodes, a measurement circuit that outputs a measurement value, a control unit that determines whether a state is a proximity state in which the indication body is close to the sensor electrodes, and a storage unit that stores as a reference value a measurement value in a state in which the indication body is not close to the sensor electrodes, wherein the control unit determines whether a state is a proximity state based on a first difference value obtained by subtracting the reference value from a measurement value, calculates a sum difference value obtained by summing up the first difference values, and when a state in which a fluctuation amount of the sum difference value is smaller than a predetermined value continues for a predetermined time or longer after the sum difference value decreases in the proximity state, updates the reference value.

13 Claims, 9 Drawing Sheets

(56) References Cited

U.S. PATENT DOCUMENTS

| | | | |
|---|---|---|---|
| 2016/0139734 | A1 | 5/2016 | Nakajima et al. |
| 2016/0334932 | A1 | 11/2016 | Nakajima et al. |
| 2017/0168639 | A1 | 6/2017 | Imai et al. |

* cited by examiner 100
105
105A
110, 120
121
111
111A
101
MAX
MIN
FT
X
Y
Z 100
130
131
CONTROL UNIT
132
MEMORY
140
TEMPERATURE SENSOR
125A
MEASUREMENT CIRCUIT
125B
IMAGE DISPLAY CIRCUIT
120
121
110
X
Y
Z

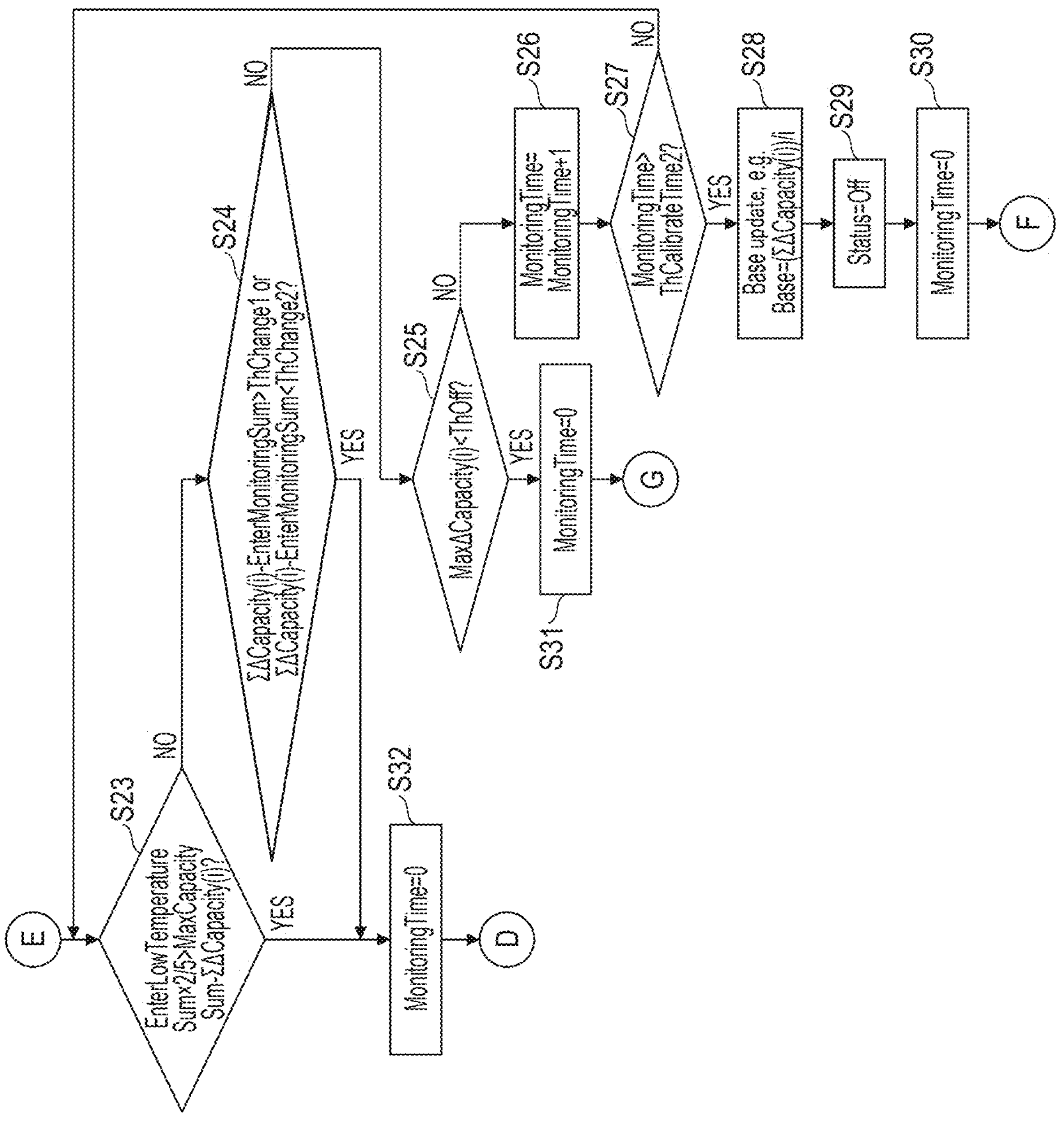
FIG. 4D
E
S23
EnterLowTemperatureSum×2/5>MaxCapacitySum-ΣΔCapacity(i)?
YES
NO
S24
ΣΔCapacity(i)-EnterMonitoringSum>ThChange1 or ΣΔCapacity(i)-EnterMonitoringSum<ThChange2?
YES
NO
S25
MaxΔCapacity(i)<ThOff?
YES
NO
S26
MonitoringTime=MonitoringTime+1
S27
MonitoringTime>ThCalibrateTime2?
YES
NO
S28
Base update, e.g. Base=(ΣΔCapacity(i))/i
S29
Status=Off
S30
MonitoringTime=0
F
S31
MonitoringTime=0
G
S32
MonitoringTime=0
D 100M2
130
131
CONTROL UNIT
132
MEMORY
140
TEMPERATURE SENSOR
125A
MEASUREMENT CIRCUIT
120M2
121
X
Y
Z

ELECTROSTATIC INPUT DEVICE

CLAIM OF PRIORITY

This application claims benefit of Japanese Patent Application No. 2024-049230 filed on Mar. 26, 2024, which is hereby incorporated by reference.

BACKGROUND OF THE INVENTION

1. Field of the Invention

The present disclosure relates to an electrostatic input device.

2. Description of the Related Art

In the related art, the touch detection device includes a sensor electrode that detects the detection capacitance in response to a touch operation, an operation determination unit that determines a touch operation based on the detection capacitance obtained by using a reference value as a measurement standard and the touch determination threshold value and the non-touch determination threshold value determined from the width of the detection capacitance relative to the reference value, and an adjustment unit that adjusts the non-touch determination threshold value when the capacitance fluctuation value, which is a difference between the detection capacitance and the reference value, takes a value within the range of the touch determination threshold value and the non-touch determination threshold value, and when the capacitance fluctuation width, which is a swing width of the detection capacitance, is smaller than the fluctuation width threshold value (see, for example, Japanese Unexamined Patent Application Publication No. 2018-116631).

In the touch detection device in the related art, when the finger is stopped while touching the sensor face during a touch operation, the reference value is updated and the device may erroneously determine that no touch operation is being performed.

Therefore, present invention provides an electrostatic input device capable of suppressing the erroneous determination that no proximity operation is being performed in a case where the finger is stopped while touching the sensor face and the updating of the reference value to an incorrect value.

SUMMARY OF THE INVENTION

An electrostatic input device of an embodiment of the present disclosure includes a plurality of electrostatic sensor electrodes, a measurement circuit that outputs a measurement value based on a capacitance between each of the plurality of electrostatic sensor electrodes and an indication body, a control unit that determines, based on the measurement value output by the measurement circuit, whether a state is a proximity state in which the indication body is in proximity to the plurality of electrostatic sensor electrodes, and a storage unit that stores as a reference value a measurement value in a state in which the indication body is not in proximity to the plurality of electrostatic sensor electrodes, wherein the control unit determines whether a state is a proximity state based on a first difference value obtained by subtracting the reference value from a measurement value, calculates a sum difference value obtained by summing up a plurality of the first difference values of the plurality of electrostatic sensor electrodes, and when a state in which a fluctuation amount of the sum difference value is smaller than a predetermined value continues for a predetermined time or longer after the sum difference value decreases in the proximity state, updates the reference value.

BRIEF DESCRIPTION OF THE DRAWINGS

FIG. 4D is a flowchart shows an example of the process executed by the control unit of the electrostatic input device of the embodiment;

DESCRIPTION OF THE PREFERRED EMBODIMENTS

Hereinafter, the embodiments to which the electrostatic input device of the present disclosure is applied will be described.

In the following, the XYZ coordinate system is defined and described. The direction parallel to the X axis (X direction), the direction parallel to the Y axis (Y direction), and the direction parallel to the Z axis (Z direction) are orthogonal to each other. In addition, plan view means viewing in the XY plane. In the following, the length, thickness, and thickness of each part may be exaggerated to make the configuration easier to understand.

Embodiments

Figure 1:
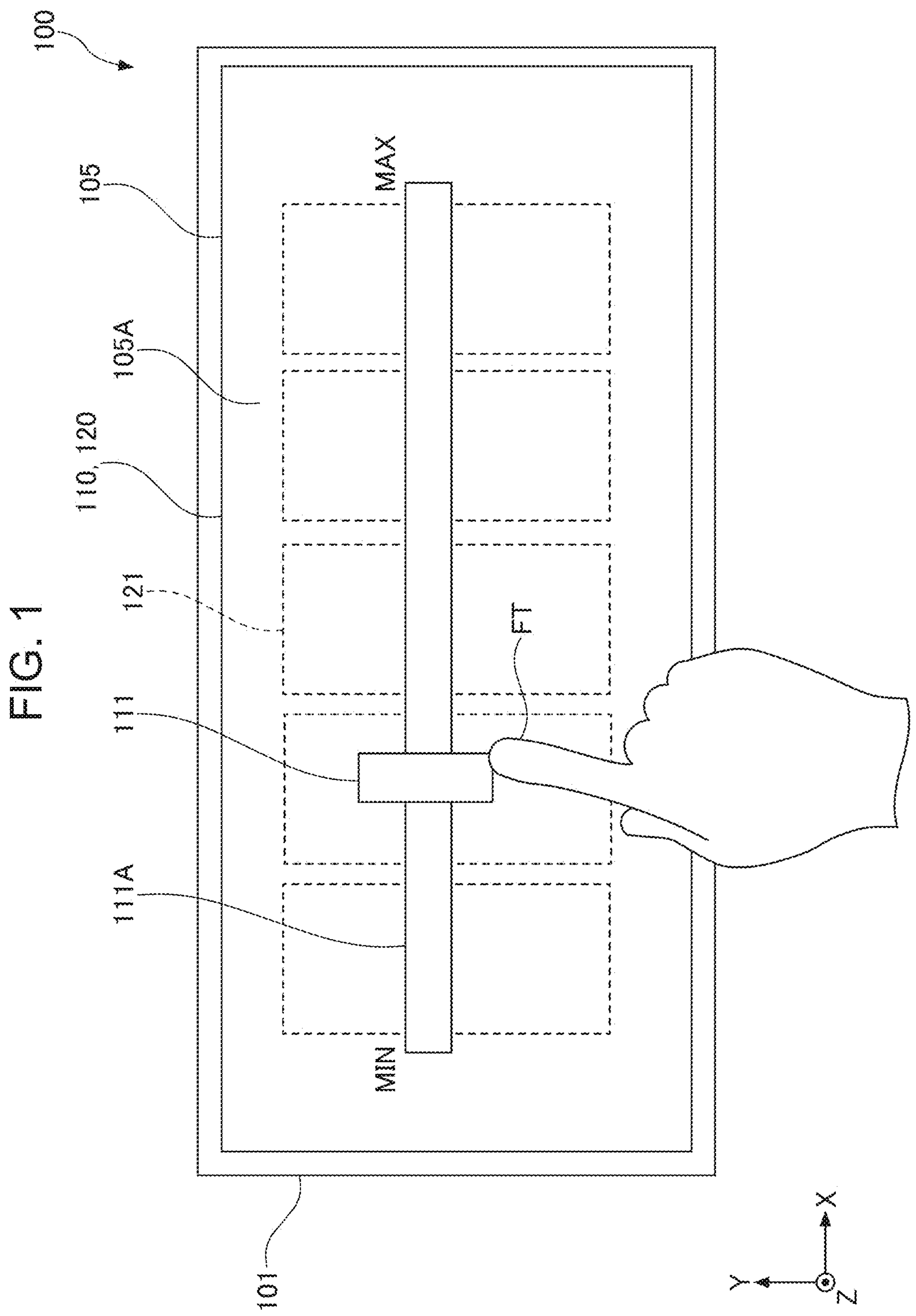
FIG. 1 is a diagram showing an example of the configuration of the electrostatic input device of the embodiment.
Figure 2:
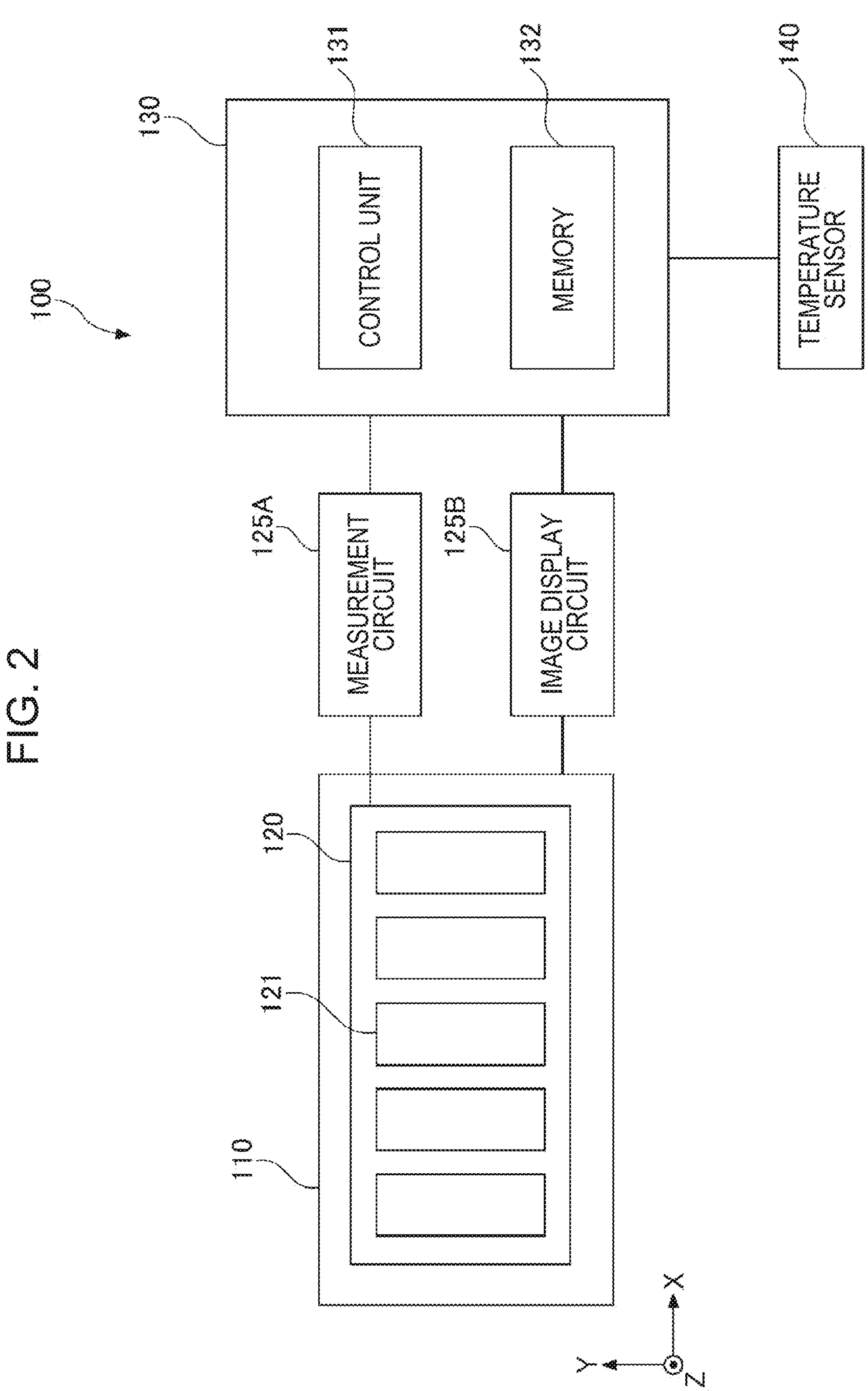
FIG. 2 is a diagram showing an example of the configuration of the electrostatic input device of the embodiment.

FIGS. 1 and 2 are diagrams showing an example of the configuration of an electrostatic input device 100 of the embodiment.

The electrostatic input device 100 is, for example, an input unit installed in the center console of a vehicle to adjust the volume of audio, and the like, or the temperature, the air volume, or the like of the air conditioner, and can adjust the volume, the temperature, the air volume, or the like by operating the slider 111 as a Graphic User Interface (GUI) switch, as an example. The electrostatic input device 100 may be a tablet-type input device or an input unit of an automatic teller machine (ATM), which is located in a store or a facility and used by an indefinite number of users. The electrostatic input device 100 may be a tablet computer, smartphone, or game console for personal use.

Overall Configuration of Electrostatic Input Device 100

The electrostatic input device 100 includes a housing 101, a top panel 105, a display 110, an electrostatic sensor 120, a measurement circuit 125A, an image display circuit 125B, a control device 130, and a temperature sensor 140.

In FIG. 1, the electrostatic sensor 120 is located behind the top panel 105 (−Z direction), and the display 110 is located behind the electrostatic sensor 120 (−Z direction). Although the measurement circuit 125A, the image display circuit 125B, the control device 130, and the temperature sensor 140 (see FIG. 2) are omitted in FIG. 1, the measurement circuit 125A, the image display circuit 125B, the control device 130, and the temperature sensor 140 are provided, as an example, behind the display 110 inside the housing 101 (−Z direction).

In FIG. 2, the housing 101 and the top panel 105 are omitted, and the display 110 is shown larger than the electrostatic sensor 120. In FIG. 2, the slider 111 on the display 110 is omitted and an electrostatic sensor electrode 121 of the electrostatic sensor 120 is shown transparently. FIG. 2 shows XYZ coordinates for the display 110 and the electrostatic sensor 120.

Housing 101 and Top Panel 105

The housing 101 is a case, made of plastic or metal, that houses the display 110, the electrostatic sensor 120, the measurement circuit 125A, the image display circuit 125B, the control device 130, and the temperature sensor 140. The display 110 is located below the transparent electrostatic sensor 120, as an example, and is visible through an operation face 105A, which is the top face of the transparent top panel 105 in the opening at the top of the housing 101. The operation face 105A is an example of a sensor face.

The user operates the electrostatic input device by bringing an indication body such as a hand close to the electrostatic sensor 120. By adjusting the sensitivity of the electrostatic sensor 120 and the thickness of the top panel 105, the device can be operated in a state in which the indication body contact the operation face 105A. In other words, the state in which the indication body contacts the operation face 105A can be regarded as proximity. By adjusting the sensitivity of the electrostatic sensor 120 and the thickness of the top panel 105, the device can be operated without the indication body touching the operation face 105A. The capacitance (measurement value) measured by the measurement circuit 125A fluctuates when the temperature of the electrostatic sensor electrode 121 of the electrostatic sensor 120 changes. In a case where the product temperature is low, the temperature of the electrostatic sensor 120 rises in a case where the user's hand (indication body) touches the operation face 105A. In a confined space such as a car interior, the temperature of the electrostatic sensor 120 may change rapidly due to heating. The electrostatic input device 100 can suppress the effects of such temperature changes.

The temperature of the electrostatic sensor electrodes of the electrostatic sensor 120 rises in a case where an indication body such as the user's hand continues to touch the cold operation face 105A for a relatively long time (for example, 2 to 10 seconds), as in a sliding operation, as an example. Although temperature may rise in a case other than the sliding operation, the following describes a form in which the user performs a sliding operation on the slider 111. In addition, the temperature may rise due to heating even in a case where the indication body such as the user's hand is not in contact with the operation face 105A. In the following, proximity is used to mean a state in which the indication body such as the user's hand is in contact with the operation face 105A and a state in which the indication body is away from the operation face 105A but very close to the operation face 105A. In both cases, the indication body is in proximity to the electrostatic sensor 120.

As an example, while the following describes a form in which the user operates the device with the fingertip FT of the hand, the electrostatic input device 100 can be operated with parts other than the fingertip FT of the hand of the user's body.

Display 110

The display 110 is a liquid crystal display or an organic electroluminescence (EL) display, as an example. The display 110 is a display unit to achieve a graphic user interface (GUI). The display 110 displays GUI images of the slider 111 and a frame 111A. The frame 111A indicates the extent to which the slider 111 can be moved. The display 110 may show a GUI button, a cursor, or the like other than the slider 111.

Electrostatic sensor 120, measurement circuit 125A, and image display circuit 125B The electrostatic sensor 120 is superimposed on the display 110 and has a plurality of electrostatic sensor electrodes 121 disposed along the X direction as shown in FIG. 2. Each electrostatic sensor electrode 121 extends in the Y direction. The measurement circuit 125A is connected to the electrostatic sensor 120. The image display circuit 125B is connected to the display 110. The measurement circuit 125A is provided between the electrostatic sensor 120 and the control device 130. The image display circuit 125B is provided between the display 110 and the control device 130.

The electrostatic sensor electrode 121 is connected to the control device 130 via the measurement circuit 125A. The electrostatic sensor 120 can be configured so that a transparent conductive film made of indium Tin Oxide (ITO) or the like is formed on the surface of transparent glass and patterned into the electrostatic sensor electrode 121. The capacitance of the electrostatic sensor 120 is input to the measurement circuit 125A. FIGS. 1 and 2 show five electrostatic sensor electrodes 121 as an example. The five electrostatic sensor electrodes 121 are positioned overlapping the slider 111 and the frame 111A, as shown in FIG. 1.

The measurement circuit 125A is mounted on a circuit board. The measurement circuit 125A is provided between the electrostatic sensor 120 and the control device 130 and converts the electrostatic capacitance of each electrostatic sensor electrode 121 to analog to digital (AD). The measurement circuit 125A outputs the capacitance (measurement value) of each electrostatic sensor electrode 121 to the control device 130.

The measurement circuit 125A scans the plurality of electrostatic sensor electrodes 121 one by one, converts the capacitance of each electrostatic sensor electrode 121 to a digital value, and calculates a difference value ΔAD at each electrostatic sensor electrode 121 by subtracting the reference value. The difference value ΔAD is a count value of the change in the output of measurement circuit 125A with respect to the reference value. The reference value is a value proportional to the capacitance of the electrostatic sensor electrode 121 in a case where there is no object such as the fingertip FT around the electrostatic sensor electrode 121. The measurement circuit 125A calculates the difference value ΔAD by subtracting the reference value from a measurement value of the capacitance of each electrostatic sensor electrode 121.

The image display circuit 125B is provided between the display 110 and the control device 130, and displays GUI images of the slider 111 and the frame 111A on the display 110 according to image data transmitted from the control device 130.

Control Device 130

The control device 130 includes a control unit 131 and a memory 132. The control device 130 is achieved by a computer including a central processing unit (CPU), a random access memory (RAM), a read only memory (ROM), an input/output interface, and an internal bus. The control unit 131 shows the functions of the program executed by the control device 130 as a functional block. The memory 132 is a functional representation of the memory of the control device 130 and is an example of a storage unit.

Control Unit 131

The control unit 131 controls the operation of the electrostatic input device 100. The control unit 131 receives the difference value ΔAD from the measurement circuit 125A and calculates the X coordinate of the fingertip FT. The X coordinate of the fingertip FT calculated by the control unit 131 is an X coordinate of one of the plurality of electrostatic sensor electrodes 121. The X coordinate of the electrostatic sensor electrode 121 is an X coordinate of the center of the electrostatic sensor electrode 121 as an example. The control unit 131 controls display of images on the display 110, the display being performed through the image display circuit 125B. The control unit 131 outputs the amount of operation of the slider 111 operated by the fingertip FT to the electronic control unit (ECU) that controls the vehicle's audio, air conditioning, and the like.

Memory 132

The memory 132 stores the reference value used by the measurement circuit 125A to calculate the difference value ΔAD. As mentioned above, the reference value is a value proportional to the capacitance of the electrostatic sensor electrode 121 in a case where there is no object such as the fingertip FT around the electrostatic sensor electrode 121, and thus varies with the temperature of the electrostatic sensor electrode 121.

When the reference value is not updated as the temperature of the electrostatic sensor electrode 121 fluctuates, the control unit 131 will not be able to correctly calculate the difference value ΔAD when the temperature of the electrostatic sensor electrode 121 fluctuates. For this reason, the electrostatic input device 100 updates the reference value in a given state. The details of this are described below using flowcharts and other information.

Temperature Sensor 140

The temperature sensor 140 detects, as an example, the temperature inside the vehicle in which the electrostatic input device 100 is mounted. The temperature inside the vehicle is an example of the temperature around the electrostatic sensor electrodes 121. The temperature sensor 140 is connected to the control device 130, and the temperature detected by the temperature sensor 140 is input to the control unit 131 of the control device 130.

State Transition Diagram Showing Operation of Electrostatic Input Device 100

Figure 3:
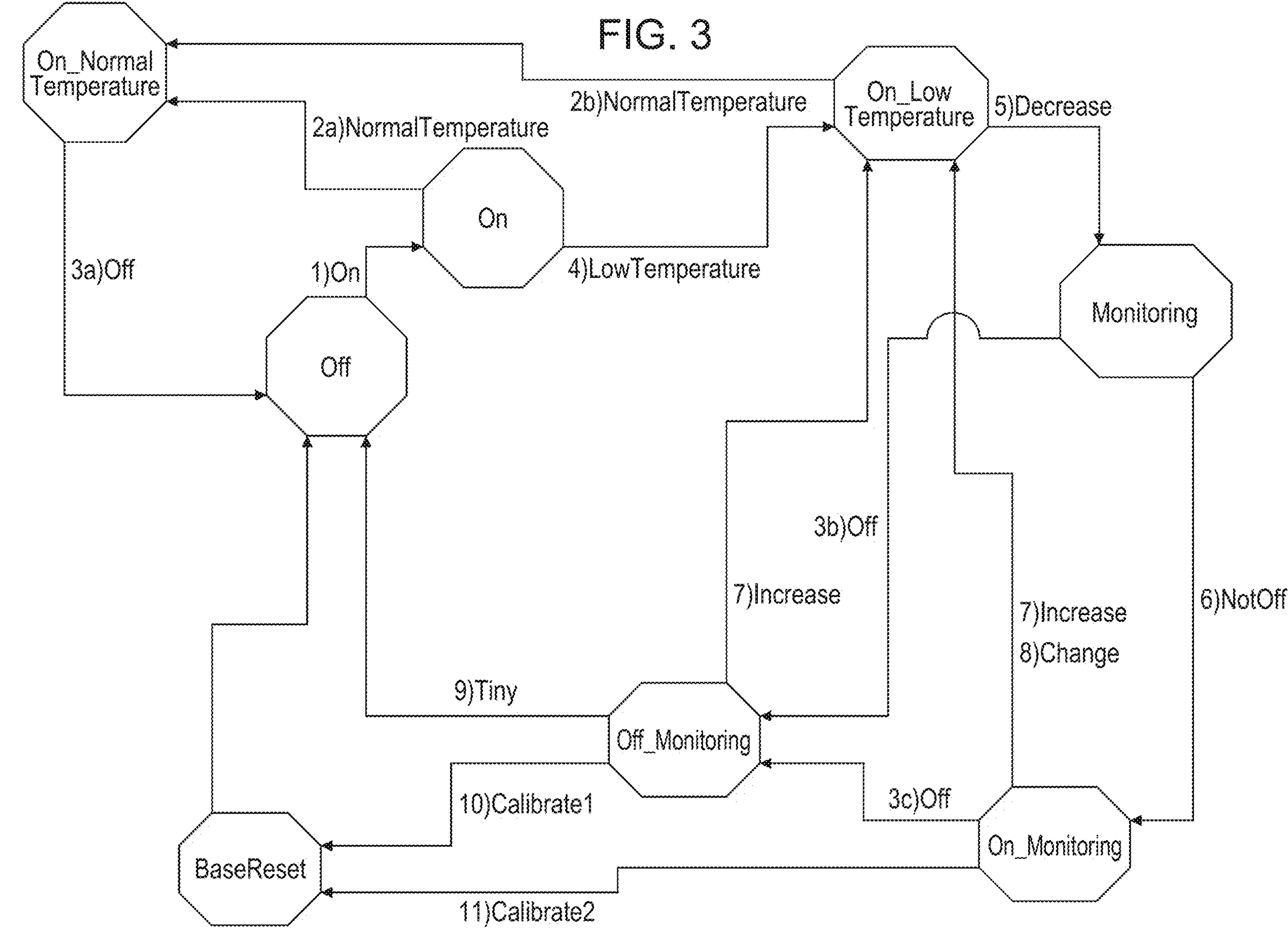
FIG. 3 is a state transition diagram showing an example of the operation of the electrostatic input device of the embodiment.
Figure 4A:
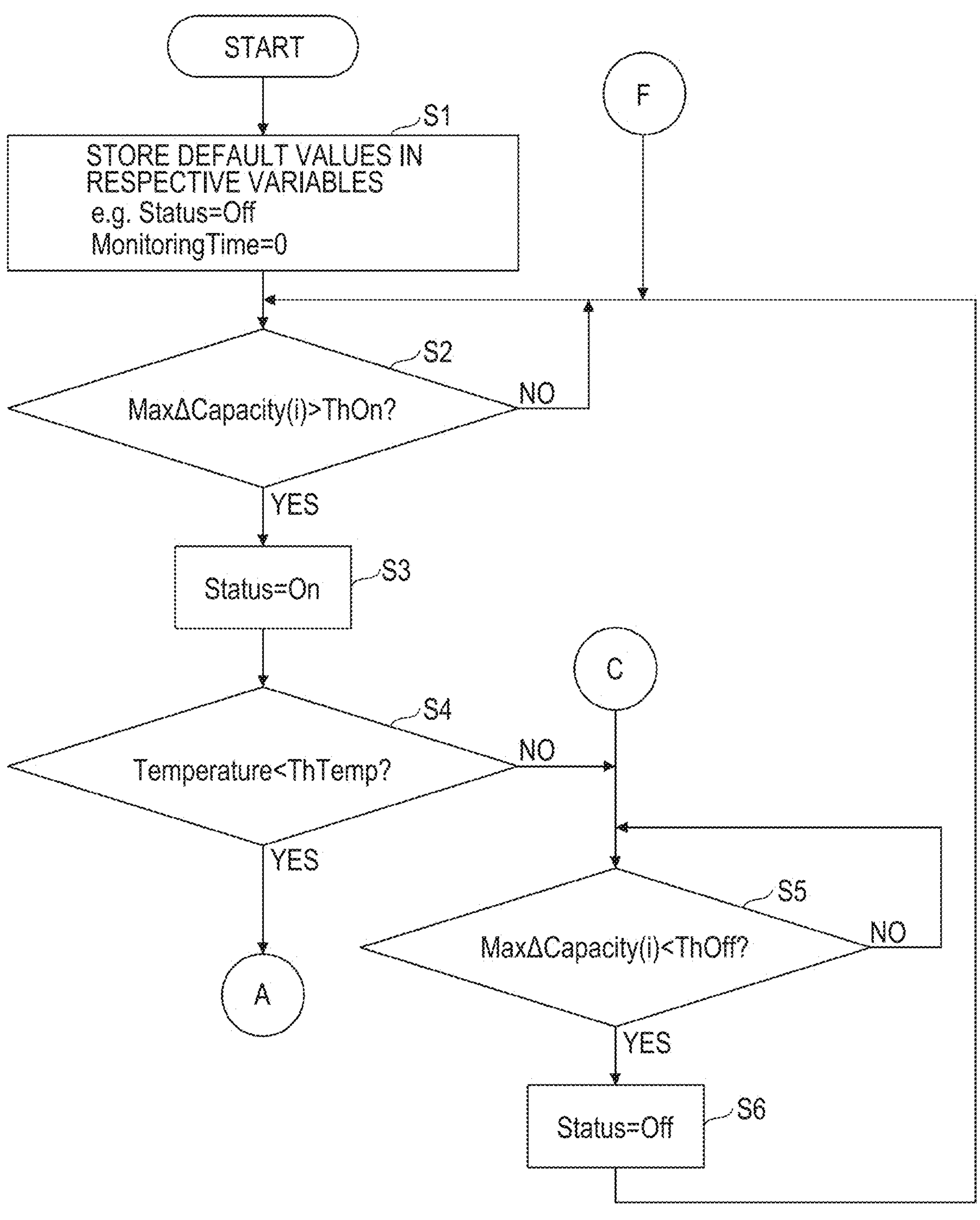
FIG. 4A is a flowchart showing an example of the process executed by the control unit of the electrostatic input device of the embodiment.
Figure 4B:
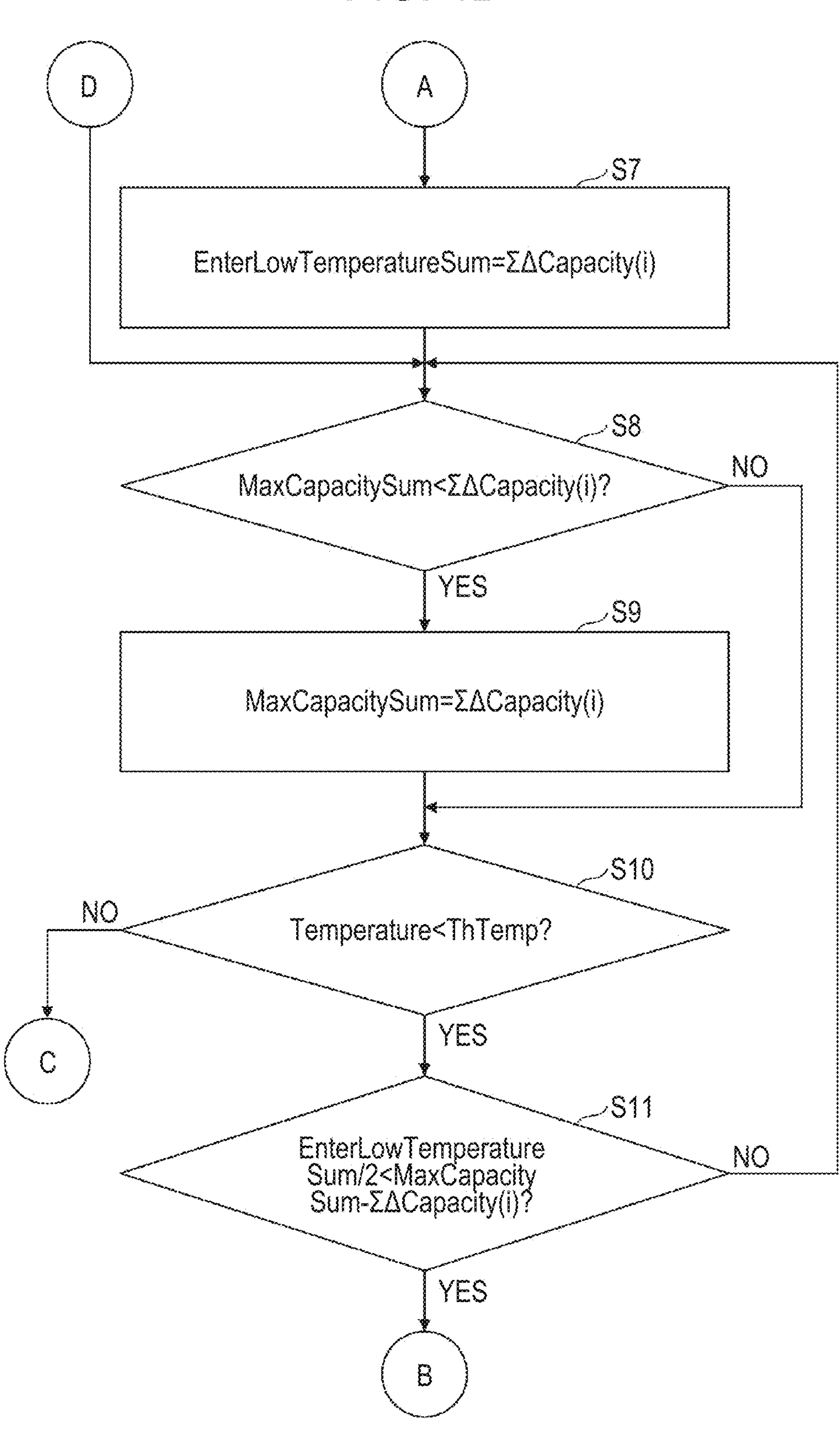
FIG. 4B is a flowchart showing an example of the process performed by the control unit of the electrostatic input device of the embodiment.
Figure 4C:
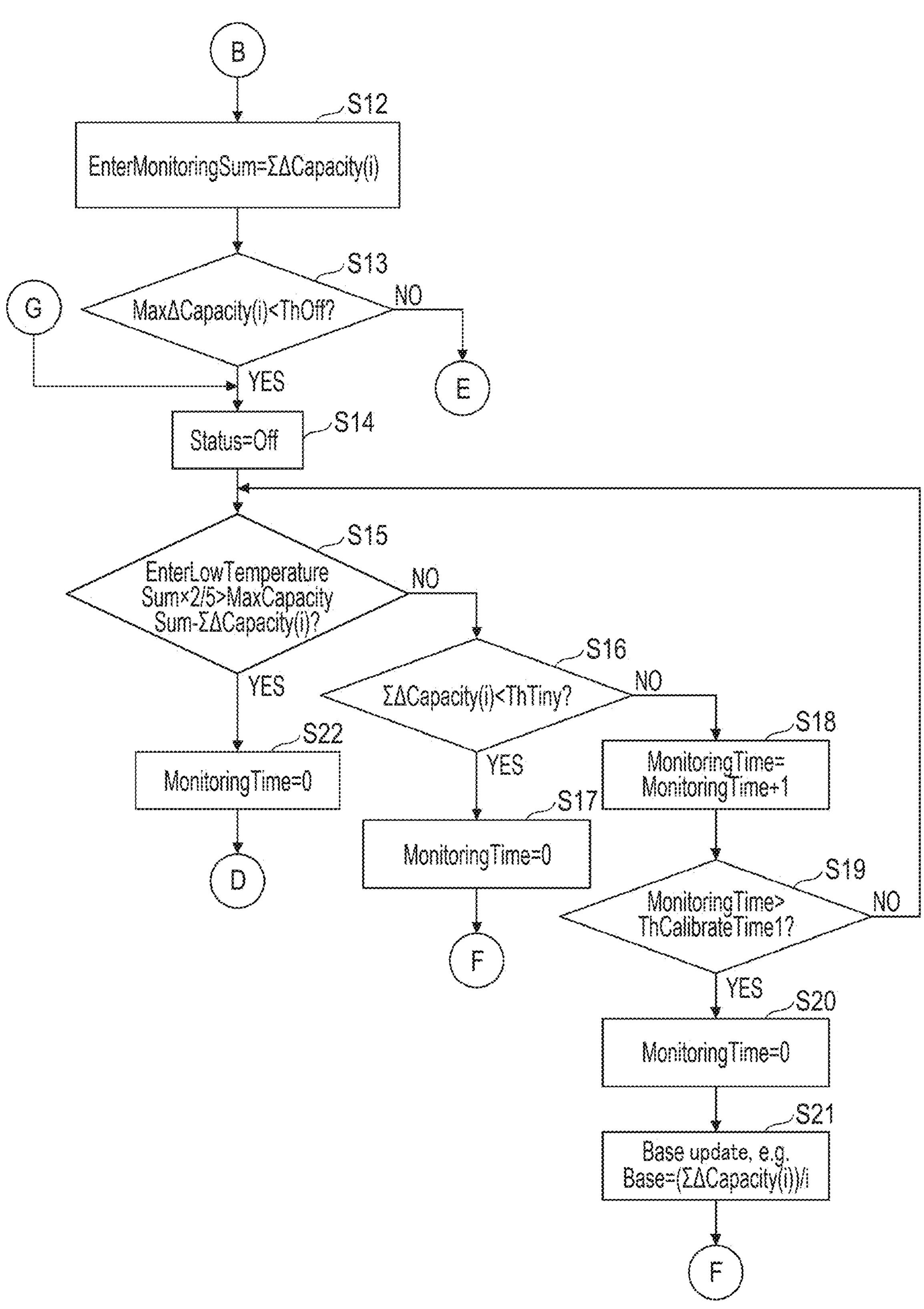
FIG. 4C is a flowchart shows an example of the process executed by the control unit of the electrostatic input device of the embodiment.

FIG. 3 is a state transition diagram representing an example of the operation of the electrostatic input device 100. The state of the electrostatic input device 100 is described here from the state of Off. As the control unit 131 performs the control process, the state of the electrostatic input device 100 transitions as follows. In the following, the difference value ΔAD is denoted as a difference value ΔCapacity. The difference value ΔAD and the difference value ΔCapacity are identical. The difference value ΔAD and the difference value ΔCapacity are examples of a first difference values.

State of Off

The state of Off is a state in which the electrostatic input device 100 is turned on, but the fingertip FT does not touch (touch) the operation face 105A, and the electrostatic input device 100 dose not detect the touch operation of the fingertip FT to the operation face 105A.

The state of Off is a state in which the control unit 131 determines that no touch operation of the fingertip FT to the operation face 105A is being performed, and is one of the proximity states of the electrostatic input device 100. There are two proximity states of the electrostatic input device 100: Off and On. The state in which the proximity state is On is a state in which the touch operation of the fingertip FT to the operation face 105A is being performed. The state in which the proximity state is Off is a state in which the touch operation of the fingertip FT to the operation face 105A is not being performed. In the Off state, the reference value is updated by a well-known method.

Transition to On Along 1)On From State of Off

In the state of Off, when the difference value ΔCapacity exceeds an On threshold value Thon, the state of the electrostatic input device 100 transitions to the state of On along 1)On. The On threshold value ThOn is an example of a proximity threshold value. The state of On is a state in which the difference value ΔCapacity exceeds the On threshold value Thon and the control unit 131 determines that the fingertip FT is touching the operation face 105A, and the proximity state of the electrostatic input device 100 is On. The On threshold value Thon is a threshold value for determining whether the proximity state is On.

Transition to On_NormalTemperature Along 2*a*)NormalTemperature From State of On In the state of On, in a case where the interior temperature detected by the temperature sensor 140 is higher than the temperature threshold value, the state of the electrostatic input device 100 transitions to the state of On_NormalTemperature along 2*a*)NormalTemperature. The temperature threshold value is 15° C. as an example and is used to determine when the temperature is low. The temperature threshold value is the boundary temperature at which the sensitivity change of the electrostatic sensor electrode 121 is not negligible in a case where the temperature of the sensor electrode 121 rises due to the fingertip FT touching the operation face 105A.

In a case where the ambient temperature is low and the temperature of the electrostatic sensor electrode 121 is low, when the slider 111 is operated for a relatively long time, from a few seconds to 10 seconds or the like, the temperature of the electrostatic sensor electrode 121 rises due to the temperature of the fingertip FT, causing the measurement value of the capacitance of the electrostatic sensor electrode 121 to increase. Therefore, the control unit 131 performs a control process according to the temperature inside the vehicle as detected by the temperature sensor 140.

In a case where the temperature inside the vehicle detected by the temperature sensor 140 is higher than the temperature threshold value, there is no risk of miscalculation of the difference value ΔCapacity, so that the control unit 131 causes a state to transition to the state of On_NormalTemperature in order to perform a control process in the normal state.

Transition to Off Along 3*a*)Off From State of On_NormalTemperature

In the On_NormalTemperature state, when the maximum value of the five difference values ΔCapacity obtained from the five electrostatic sensor electrodes 121 is lower than the Off threshold value, the state of the electrostatic input device 100 transitions to the state of Off along 3*a*)Off. The Off threshold value is a threshold value for determining whether the proximity state is Off.

Transition to On_LowTemperature Along 4)LowTemperature From State of On

In the state of On, in a case where the vehicle interior temperature detected by the temperature sensor 140 is lower than the temperature threshold value, the state of the electrostatic input device 100 transitions to the state of On_LowTemperature along 4)LowTemperature. In the state of On_LowTemperature, the control unit 131 takes into account the effect of the temperature rise of the electrostatic sensor electrode 121 due to the operation of the slider 111 in the control process.

Transition to On_NormalTemperature Along 2*b*)NormalTemperature From State of On_LowTemperature In the state of On_LowTemperature, when the vehicle interior temperature detected by the temperature sensor 140 is higher than the temperature threshold value, the state of the electrostatic input device 100 transitions to the state of On_NormalTemperature along 2*b*)NormalTemperature. Since the temperature has returned from low to high, the electrostatic input device 100 transitions to the state of On_NormalTemperature.

Transition to Monitoring Along 5)Decrease From State of On_LowTemperature

In the state of On_LowTemperature, when the measurement value of the electrostatic sensor electrode 121 drops significantly, the state of the electrostatic input device 100 transitions to the state of Monitoring along 5)Decrease. Monitoring is a state in which monitoring (Monitoring) is initiated to determine whether the proximity state is On or Off because of a significant drop in the measurement value of the electrostatic sensor electrode 121. Monitoring has two states, Off_Monitoring and On_Monitoring, as described below. Both are transitioning from On_LowTemperature, which indicates that they are On at a low temperature. Therefore, the reference value may have changed significantly due to a change in temperature. Therefore, there is a possibility that the control unit 131 may incorrectly determine On/Off. In the present invention, On/Off and the necessity of updating the reference value are determined in the two monitoring states by a criterion different from the well-known criterion (the magnitude relationship between the measurement value and the threshold value). The system then determines On/Off with high accuracy, and also appropriately and promptly determines whether a reference value update is necessary.

Transition to Off_Monitoring Along 3*b*)Off From state of Monitoring

In the state of Monitoring, in a case where the maximum value of the five difference values ΔCapacity obtained from the five electrostatic sensor electrodes 121 is lower than the Off threshold value, the state of the electrostatic input device 100 transitions to the state of Off_Monitoring along 3*b*)Off. The state of Off_Monitoring is an example of a non-proximity monitoring state. Off_Monitoring is a state in which the measurement value of the electrostatic sensor electrode 121 has dropped significantly and the maximum difference value ΔCapacity is lower than the Off threshold value, but the proximity state is monitored to determine whether it is really Off.

Transition to On_Monitoring Along 6)NotOff From State of Monitoring

In the state of Monitoring, in a case where the maximum value of the five difference values ΔCapacity obtained from the five electrostatic sensor electrodes 121 is higher than the Off threshold value, the state of the electrostatic input device 100 transitions to the state of On_Monitoring along 6)NotOff. The state of On_Monitoring is a proximity monitoring state. On_Monitoring is a state that although the measurement value of the electrostatic sensor electrode 121 has dropped significantly, the maximum difference value ΔCapacity is higher than the Off threshold value, so that the proximity state is monitored whether it is really On.

Transition to On_LowTemperature Along 7)Increase From State of Off_Monitoring In the state of Off_Monitoring, in a case where the increase in the sum of the five difference values ΔCapacity obtained from the five electrostatic sensor electrodes 121 is large, it is considered that the fingertip FT, which was moved away from the operation face 105A, is brought closer again. Therefore, the state of the electrostatic input device 100 transitions to the state of On_LowTemperature along 7)Increase. This is to redo the process in the state of On_LowTemperature. In the state of Off_Monitoring, there is a high possibility that the fingertip FT is away from the operation face 105A. However, there is a slight possibility that the fingertip FT is not away from the operation face 105A. Therefore, when the control unit 131 updates the reference value, the reference value may be set to an incorrect value. When the reference value is incorrect, the control unit 131 cannot correctly determine the proximity state/non-proximity state (On/Off). By using the amount of increase in the sum of the five difference values ΔCapacity, it can be accurately determined that the state is accurately the proximity state (On) regardless of the accuracy of the reference value.

Transition to Off Along 9)Tiny From State of Off_Monitoring

In the state of Off_Monitoring, in a case where the sum of the five difference values ΔCapacity obtained from the five electrostatic sensor electrodes 121 is minimal, the fingertip FT is considered to be away from the operation face 105A. Therefore, the state of the electrostatic input device 100 transitions to Off along 9)Tiny. When the control unit 131 confirms that the reference value has hardly changed, the state transitions to "Off", in which the process similar to that of the well-known technology is performed, from "Off_Monitoring", in which monitoring unique to the present invention is performed.

Transition to BaseReset Along 10)Calibrate1 From State of Off_Monitoring In the state of Off_Monitoring, in a case where the fluctuation of the sum of the five difference values ΔCapacity obtained from the five electrostatic sensor electrodes 121 is small and the duration of the state in which the fluctuation of sum of the difference values ΔCapacity is small has passed the first update time for updating the reference value, the state is considered to be a state in which the fingertip FT is away from the operation face 105A. Since the condition of 9)Tiny is not met, the reference value is considered to have fluctuated due to temperature and other factors. Therefore, the state of the electrostatic input device 100 transitions to BaseReset along 10)Calibrate1. The reference value stored in the memory 132 is updated based on the measurement value of the electrostatic sensor electrode 121. When the reference value is updated, the state of the electrostatic input device 100 transitions to the state of Off. Off_Monitoring is a state in which the difference value has decreased. In a case where the state in which the difference value decreases and the fluctuation of the difference value remains small continues there is a very high possibility that the fingertip FT is away from the operation face 105A. Conversely, in a case where the fingertip FT is in contact with the operation face 105A and is not moved, the reference value is not updated. Since it is possible to accurately determine that the fingertip FT is away from the operation face 105A, the first update time can be shortened and the reference value can be promptly updated to the correct value.

Transition to On_LowTemperature Along 7)Increase From State of On_Monitoring In the state of On_Monitoring, in a case where the fluctuation of the sum of the five difference values ΔCapacity obtained from the five electrostatic sensor electrodes 121 is small, but there is a fluctuation in which the sum of the Δcapacities increases due to an operation of bringing the finger closer again, the state transitions to the state of On_LowTemperature along 7)Increase. In other words, the process returns to a process of the state in which the operation face 105A is securely touched with the fingertip FT.

Transition to On_LowTemperature Along 8)Change From State of On_Monitoring

In the state of On_Monitoring, in a case where the fluctuation of the sum of the five difference values ΔCapacity obtained from the five electrostatic sensor electrodes 121 is large, the state is considered to be a stated in which the fingertip FT is moved on the operation face 105A. When the fingertip FT is moved on the operation face 105A, the area in which the electrostatic sensor electrode 121 and the fingertip FT faces changes, and the sum of the five difference values ΔCapacity fluctuates. Therefore, the state of the electrostatic input device 100 transitions to the state of On_LowTemperature along 8)Change. In other words, the process returns to a process of the state in which the operation face 105A is securely touched with the fingertip FT.

Transition to Off_Monitoring Along 3*c*)Off From State of On_Monitoring

In the state of On_Monitoring, in a case where the maximum value MaxΔCapacity(i) of the five difference values ΔCapacity obtained from the five electrostatic sensor electrodes 121 is smaller than the Off threshold value ThOff, the proximity state is considered to be Off. Therefore, the state of the electrostatic input device 100 transitions to Off_Monitoring along 3*c*)Off.

Transition to BaseReset Along 11)Calibrate2 From State of On_Monitoring

In the state of On_Monitoring, in a case where the fluctuation of the sum of the five difference values ΔCapacity obtained from the five electrostatic sensor electrodes 121 is small and the duration of the state in which the fluctuation of the sum of the difference values ΔCapacity is small has passed the second update time for updating the reference value, although the fingertip FT is away from the operation face 105A, it is considered that the reference value fluctuates and the proximity state is On. For this reason, the reference value is updated and then the proximity state is Off. In other words, the state of the electrostatic input device 100 transitions to Off via BaseReset along 11)Calibrate2. The measurement value of the electrostatic sensor electrode 121 is acquired and the reference value stored in the memory 132 is updated. Even when the fingertip FT is stopped with the fingertip FT in contact with the operation face 105A, the fluctuation of the sum of the difference value ΔCapacity will remain small. Therefore, the second update time should be set to a long time to prevent the reference value from being updated to an incorrect value. The state of On_Monitoring is also a state in which the difference value has decreased. In a case where the state in which the difference value decreases and the fluctuation of the difference value remains small continues there is a high possibility that the fingertip FT is away from the operation face 105A. In other words, it is possible to accurately determine that the fingertip FT is away from the operation face 105A.

Flowchart

FIGS. 4A through 4D are flowcharts showing an example of a process performed by the control unit 131 of the electrostatic input device 100.

When starting the process (Start), the control unit 131 stores a default value in each variable (step S1). Specifically, assign Off to the proximity state Status and 0 to MonitoringTime. The "=" in the flowchart means to assign the value of the right side to the variable on the left side. This means the operation of assigning a value to a variable. The proximity state Status is a variable that represents On or Off. In other words, when the indication body FT is in proximity to the electrostatic sensor electrode 121, the control unit 131 assigns On to the proximity state Status. On the other hand, when the indication body FT is not in proximity to the electrostatic sensor electrode 121, the control unit 131 assigns Off to the proximity state Status. MonitoringTime is a variable that represents the time for which the state of Off_Monitoring shown in FIG. 3 is continued.

The control unit 131 determines whether the maximum value MaxΔCapacity(i) of the plurality of difference values ΔCapacity(i) is larger than the On threshold value Thon (step S2). i represents the i-th of the plurality of difference values ΔCapacity. In a case where the number of electrostatic sensor electrodes 121 is five, i can take values from 1 to 5. The On threshold value ThOn is an example of a proximity threshold value.

In a case where it is determined that the maximum value MaxΔCapacity(i) is larger than the On threshold value Thon (S2: Yes), the control unit 131 sets the proximity state Status to On (step S3).

In a case where it is determined in step S2 that the maximum value MaxΔCapacity(i) is less than or equal to the On threshold value Thon (S2: No), the control unit 131 performs the process of step S2 again.

The control unit 131 determines whether the temperature inside the vehicle (Temperature) detected by the temperature sensor 140 is lower than the temperature threshold value (ThTemp) (step S4). This is to determine whether the temperature of the electrostatic sensor electrode 121 has decreased. In a case where there is no temperature sensor 140, the temperature may be determined by a reference value. When the temperature is low, the sensitivity of the electrostatic sensor is low and the reference value is low. Therefore, in a case where the reference value is lower than the predetermined value, the process may branch to S4: Yes, and in a case where the reference value is higher than the predetermined value, the process may branch to S4: No.

When it is determined that the temperature inside the vehicle (Temperature) detected by the temperature sensor 140 is greater than or equal to the temperature threshold value (ThTemp) (S4: No), the control unit 131 determines whether the maximum value MaxΔCapacity(i) is smaller than the Off threshold value ThOff (step S5). This is to determine whether the fingertip FT is away from the operation face 105A in the state in which the temperature inside the vehicle is not low. The Off threshold value ThOff is the non-proximity threshold value.

When it is determined that the maximum value MaxΔCapacity(i) is greater than or equal to the Off threshold value ThOff (S5: No), the control unit 131 repeats the process of step S5, and when it is determined that the maximum value MaxΔCapacity(i) is smaller than the Off threshold value ThOff (S5: Yes), the control unit 131 sets the proximity state Status to Off (step S6). In other words, the process or Status=Off is performed. The control unit 131 updates the reference value in a well-known manner (not shown).

When finishing the process step S6, the control unit 131 returns the process to step S2. This is to prepare for the next operation.

In a case where it is determined in step S4 that the temperature inside the vehicle (Temperature) detected by the temperature sensor 140 is lower than the temperature threshold value (ThTemp) (S4: Yes), the control unit 131 stores the sum difference value ΣΔCapacity(i) that is the sum of the latest five difference values ΔCapacity(i) in the memory 132 as the low temperature sum difference value (EnterLowTemperatureSum) when the temperature inside the vehicle has decreased (step S7). That is, EnterLowTemperatureSum=ΣΔCapacity(i).

The control unit 131 determines whether the sum difference value ΣΔCapacity(i) is larger than the maximum value (MaxCapacitySum) of the sum difference value ΣΔCapacity(i) up to the point (step S8). In other words, the control unit 131 determines whether MaxCapacitySum<ΣΔCapacity(i).

When it is determined that the sum difference value ΣΔCapacity(i) is larger than the maximum value (MaxCapacitySum) (S8: Yes), the control unit 131 assigns the sum difference value ΣΔCapacity(i) to the maximum value (MaxCapacitySum) of the sum difference value ΣΔCapacity(i) up to the point (step S9). That is, the process of MaxCapacitySum=ΣΔCapacity(i) is performed. When finishing processing step S9, the control unit 131 advances the process to step S10.

In a case where it is determined in step S8 that the sum difference value ΣΔCapacity(i) is less than or equal to the maximum value (MaxCapacitySum) (S8: No), the control unit 131 skips the process in step S9 and advances the process to step S10.

Instead of determining in step S8 whether the sum difference value ΣΔCapacity(i) is larger than the maximum value (MaxCapacitySum) of the sum difference value ΣΔCapacity(i) up to the point, the control unit 131 may determine whether each of the five difference values ΔCapacity(i) larger than the maximum value (MaxCapacitySum). When at least one of the five difference values ΔCapacity(i) is larger than the maximum value (MaxCapacitySum), the control unit 131 may perform the process of step S9. When all of the five difference values ΔCapacity(i) are smaller than the maximum value (MaxCapacitySum), the control unit 131 may advance the process to step S10 without performing the process in step S9.

In this way, instead of the sum difference value ΣΔCapacity(i), the maximum value of the five difference values ΔCapacity(i) may be used. In the processing described below, instead of the sum difference value ΣΔCapacity(i), the maximum value of the five difference values ΔCapacity(i) may be used.

The control unit 131 determines whether the temperature inside the vehicle (Temperature) detected by the temperature sensor 140 is lower than the temperature threshold value (ThTemp) (step S10). This is to determine whether the temperature of the electrostatic sensor electrode 121 has decreased. In a case where the temperature sensor 140 is not used, the determination in step S10 is omitted.

When it is determined that the temperature inside the vehicle (Temperature) detected by the temperature sensor 140 is greater than or equal to the temperature threshold value (ThTemp) (S10: No), the control unit 131 advances the process to step S5. This is to determine whether the fingertip FT is away from the operation face 105A in the state in which the temperature inside the vehicle is not low.

When it is determined that the temperature inside the vehicle (Temperature) detected by the temperature sensor 140 is lower than the temperature threshold value (ThTemp) (S10: Yes), the control unit 131 determines whether the value obtained by subtracting the latest sum difference value ΣΔCapacity(i) from the maximum value (MaxCapacitySum) of the sum difference value ΣΔCapacity(i) up to the point is larger than the value of ½ of the low temperature sum difference value (EnterLowTemperatureSum) (step S11). In other words, the control unit 131 determines whether EnterLowTemperatureSum/2<MaxCapacitySum−ΣΔCapacity(i) is satisfied. Step S11 is a process of determining whether the latest sum difference value ΣΔCapacity(i) is lower. MaxCapacitySum−ΣΔCapacity(i) is an example of a second difference value. The value of ½ of the low temperature sum difference value (EnterLowTemperatureSum/2) is an example of a decrease threshold value. The constant (½) that is multiplied by the low temperature sum difference value is an example of a first constant. The first constant is not limited to ½, but may be any appropriate value.

In a case where the latest sum difference value ΣΔCapacity(i) is low, it is possible that the fingertip FT is away from the operation face 105A, so that step S11 is performed in order to monitor whether the reference value is required to be updated.

When determining that EnterLowTemperatureSum/2<MaxCapacitySum−ΣΔCapacity(i) is not satisfied (S11: No), the control unit 131 returns the process to step S8. This is because the latest sum difference value ΔΣCapacity(i) is not low and is compared to the maximum value (MaxCapacitySum).

When it is determined that EnterLowTemperatureSum/2<MaxCapacitySum−ΣΔCapacity(i) is satisfied (S11: Yes) in step S11, the control unit 131 stores, in the memory 132, the latest ΣΔCapacity(i) as the sum difference value (EnterMonitoringSum) when Monitoring is started (step S12). That is, the control unit 131 assigns ΣΔCapacity(i) to EnterMonitoringSum.

The control unit 131 determines whether the maximum value MaxΔCapacity(i) among the latest five difference values ΔCapacity(i) is smaller than the Off threshold value ThOff (step S13). In other words, the control unit 131 determines whether MaxΔCapacity(i)<Thoff is satisfied. This is to check the proximity state.

When it is determined that the maximum value MaxΔCapacity(i) is smaller than the Off threshold value ThOff (S13: Yes), the control unit 131 sets the proximity state to Off (step S14). In other words, the process or Status=Off is performed.

When it is determined in step S13 that the maximum value MaxΔCapacity(i) is greater than or equal to the Off threshold value ThOff (S13: No), the control unit 131 advances the process to step S23. This is because the proximity state is On and the maximum value MaxΔCapacity(i) is somewhat large, so that the process (step S23 or later) proceeds to a process of determining whether to update the reference value. The process after step S23 is described below.

After completing the process of step S14, the control unit 131 determines whether the value obtained by subtracting the latest sum difference value ΣΔCapacity(i) from the Maximum value (MaxCapacitySum) of the sum difference value ΣΔCapacity(i) up to the point is smaller than ⅖ of the low temperature sum difference value (EnterLowTemperatureSum) (step S15). In other words, the control unit 131 determines whether EnterLowTemperatureSum×⅖>MaxCapacitySum−ΣΔCapacity(i) is satisfied. Step S15 is a process of determining whether the latest sum difference value ΣΔCapacity(i) has increased significantly. When the sum difference value ΣΔCapacity(i) increases significantly, the control unit 131 determines that the fingertip FT has touched the operation face 105A. The constant (⅖) that is multiplied by the low temperature sum difference value is an example of a second constant. The second constant is not limited to ⅖, but may be any appropriate value.

When it is determined that EnterLowTemperatureSum×⅖>MaxCapacitySum−ΣΔCapacity(i) is not satisfied (S15: No), the control unit 131 determines whether the latest sum difference value ΣΔCapacity(i) is smaller than the minimum fluctuation threshold value ThTiny (step S16). In other words, the control unit 131 determines whether ΣΔCapacity(i)<ThTiny is satisfied.

When it is determined that the latest sum difference value ΣΔCapacity(i) is smaller than the minimum fluctuation threshold value ThTiny (S16: Yes), the control unit 131 performs the process of MonitoringTime=0 (step S17). That is, the control unit 131 assigns 0 to MonitoringTime. Since MonitoringTime represents the time during which the state of Off_Monitoring (see FIG. 3) is continued, that MonitoringTime reaches zero corresponds to that the state of Off_Monitoring is ended (see FIG. 3).

When the process in step S17 is finished, the control unit 131 returns the process to step S2. Returning to step S2 corresponds to transitioning to the state of Off along 9)Tiny. In step S2, whether the proximity state is On is determined.

When the process proceeds from step S16 to step S17, the proximity state is Off and the fluctuation of the latest sum difference value ΣΔCapacity(i) is minimal, so that it is assumed that no touch is actually performed. In this state, since the reference value stored by the memory 132 is considered to be the proper value, the proximity state is turned Off without updating the reference value.

When it is determined in step S16 that the latest sum difference value ΣΔCapacity(i) is greater than or equal to the minimum fluctuation threshold value ThTiny (S16: No), the control unit 131 increments MonitoringTime (step S18). In other words, the process of MonitoringTime=MonitoringTime+1 is performed.

The control unit 131 determines whether the MonitoringTime has passed the first update time ThCalibrateTime1 (step S19). In other words, the control unit 131 determines whether MonitoringTime>ThCalibrateTime1 is satisfied. The determination in step S19 is made with the fingertip FT considered not touching the operation face 105A, so that the first update time ThCalibrateTime1 is shorter than the second update time ThCalibrateTime2 described below. Each of the first update time ThCalibrateTime1 and the second update time ThCalibrateTime2 is an example of a predetermined time.

When it is determined that MonitoringTime has not passed the first update time ThCalibrateTime1 (S19: No), the control unit 131 returns the process to step S15. Repeating the loop through steps S15, S16, S18, and S19 and returning to step S15 increases the value of MonitoringTime.

When the control unit 131 determines in step S19 that MonitoringTime has passed the first update time ThCalibrateTime1 (S19: Yes), the control unit 131 sets MonitoringTime to zero (step S20). In other words, the control unit 131 performs the process of MonitoringTime=0 and terminates the state of Off_Monitoring.

The control unit 131 updates the reference value (step S21). The control unit 131 sets the value ΣΔCapacity(i)/i obtained by dividing the sum difference value ΣΔCapacity(i), which is the sum of the latest five difference values ΔCapacity(i), by 5, which is the number of electrostatic sensor electrodes 121, to the reference value (Base). That is, the process of Base=(ΣΔCapacity(i))/i is performed. In other words, ΣΔCapacity(i))/i is stored in the memory 132 as a new reference value. This process corresponds to transitioning to the state of BaseReset along 10)Calibrate1.

In this way, in the state in which the temperature inside the vehicle detected by the temperature sensor 140 is lower than the temperature threshold value ThTemp and no touch operation is performed, the reference value is updated to a value corresponding to the temperature inside the vehicle.

When the process in step S20 is finished, the control unit 131 returns the process to step S2. Returning to step S2 corresponding to transitioning to the state of Off. When returning to step S2, the control unit 131 determines whether the proximity state is On. The updated reference value is used to determine the proximity state.

When the process proceeds from step S16 to step S17, the proximity state is Off and the latest sum difference value ΣΔCapacity(i) is minimal, so that the hand is considered not to be in proximity to the electrostatic sensor 120. This state means that the difference between each difference value ΔCapacity(i) and the reference value (Base value) is small. Since the reference value stored by the memory 132 is the proper value, the proximity state is Off without updating the reference value.

When it is determined in step S15 that EnterLowTemperatureSum×⅖>MaxCapacitySum−ΣΔCapacity(i) is satisfied (S15: Yes), the control unit 131 sets MonitoringTime to zero (step S22). That is, the control unit 131 sets MonitoringTime=0. The determination Yes in step S15 is made in a case where the value of MaxCapacitySum−ΣΔCapacity(i) is smaller due to an increase in ΣΔCapacity(i).

"The process in step S22 is finished and the process returns to step S8" corresponds to transitioning to the state of On_LowTemperature along 7)Increase from the state of Off_Monitoring. Since it is no longer in the state of Off_Monitoring, the control unit 131 sets the MonitoringTime to zero (step S22). After finishing the process in step S22, the control unit 131 returns the process to step S8 to determine whether the latest sum difference value ΣΔCapacity(i) is larger than the maximum value (MaxCapacitySum) of the sum difference value ΣΔCapacity(i) up to the point.

When it is determined in step S13 that the maximum value MaxΔCapacity(i) is greater than or equal to the Off threshold value ThOff (S13: No), the control unit 131 determines whether the value obtained by subtracting the latest sum difference value ΣΔCapacity(i) from the maximum value (MaxCapacitySum) of the sum difference value ΣΔCapacity(i) up to the point is smaller than ⅖ of the low temperature sum difference value (EnterLowTemperatureSum) (step S23). The process in step S23 is similar to the process in step S15, and the control unit 131 determines whether EnterLowTemperatureSum×⅖>MaxCapacitySum−ΣΔCapacity (i) is satisfied. Step S23 is a process of determining whether the latest sum difference value ΣΔCapacity(i) has increased significantly. When the sum difference value ΣΔCapacity(i) increases significantly, the control unit 131 determines that the fingertip FT is securely away from the operation face 105A.

When determining that EnterLowTemperatureSum×⅖>MaxCapacitySum−ΣΔCapacity(i) does not hold (S23: No), the control unit 131 determines whether ΣΔCapacity(i)−EnterMonitoringSum>ThChange1 or ΣΔCapacity(i)−EnterMonitoringSum<ThChange2 is established (step S24).

ΣΔCapacity(i)−EnterMonitoringSum>ThChange1 is a process of determining whether the value obtained by subtracting the sum difference value EnterMonitoringSum at the start of Monitoring from the sum difference value ΣΔCapacity(i) is larger than the positive first change constant ThChange1 in a case where the sum difference value ΣΔCapacity(i) has increased. When the fingertip FT is moved on the operation face 105A, the area in which the fingertip FT and the electrostatic sensor electrode 121 face changes, and the sum difference value ΣΔCapacity(i) changes. When the sum difference value ΣΔCapacity(i) changes, the control unit 131 determines that the fingertip FT is securely away from the operation face 105A.

ΣΔCapacity(i)−EnterMonitoringSum<ThChange2 is a process of determining whether the value obtained by subtracting the sum difference value EnterMonitoringSum at the start of Monitoring from the sum difference value ΔΣCapacity(i) is smaller than the negative second change constant ThChange2 in a case where the sum difference value ΣΔCapacity(i) decreases. When the fingertip FT is moved on the operation face 105A, the area in which the fingertip FT and the electrostatic sensor electrode 121 face changes, and the sum difference value ΣΔCapacity(i) changes. When the sum difference value ΣΔCapacity(i) changes in the state of On_Monitoring, the control unit 131 determines that the fingertip FT is securely away from the operation face 105A.

When it is determined that neither ΣΔCapacity(i)−EnterMonitoringSum>ThChange1 nor ΣΔCapacity(i)−EnterMonitoringSum<ThChange2 is satisfied (S24: No), the control unit 131 determines whether the maximum value MaxΔCapacity(i) among the five latest ΣΔCapacity(i) is smaller than the Off threshold value ThOff (step S25). In other words, the control unit 131 determines whether MaxΔCapacity(i)<ThOff is satisfied. This is to check the proximity state.

When it is determined that the maximum value MaxΔCapacity(i) is greater than or equal to the Off threshold value ThOff (S25: No), the control unit 131 increments MonitoringTime (step S26). In other words, the process of MonitoringTime=MonitoringTime+1 is performed.

The control unit 131 determines whether the MonitoringTime has passed the second update time ThCalibrateTime2 (step S27). In other words, the control unit 131 determines whether MonitoringTime>ThCalibrateTime2 is satisfied. The determination in step S27 is made while the fingertip FT may be touching the operation face 105A, so that the second update time ThCalibrateTime2 is longer than the first update time ThCalibrateTime1 used in step S19.

When it is determined that MonitoringTime has not passed the second update time ThCalibrateTime2 (S27: No), the control unit 131 returns the process to step S23.

When it is determined in step S27 that MonitoringTime has passed the second update time ThCalibrateTime2 (S27: Yes), the control unit 131 updates the reference value (step S28). The control unit 131 sets the value ΣΔCapacity(i)/i obtained by dividing the sum difference value ΣΔCapacity(i), which is the sum of the latest five difference values ΔCapacity(i), by 5, which is the number of electrostatic sensor electrodes 121, to the reference value (Base). That is, the process of Base=(ΣΔCapacity(i))/i is performed. (ΣΔCapacity(i))/i is stored in the memory 132 as a new reference value.

The control unit 131 sets the proximity state to Off (step S29). That is, the control unit 131 assigns Off to Status.

In this way, in the state in which the temperature inside the vehicle detected by the temperature sensor 140 is lower than the temperature threshold value ThTemp and no touch operation is performed, the reference value is updated to a value corresponding to the temperature inside the vehicle.

That the process proceeds from step S28 to step S29 corresponds to transitioning to the state of BaseReset from the state of Off.

The control unit 131 sets MonitoringTime to zero (step S30). That is, the control unit 131 sets MonitoringTime=0. A case where the process proceeds from step S28 through step S29 to step S30, corresponds to a case where the process proceeds from 11)Calibrate2 through BaseReset to Off in FIG. 3.

When it is determined in step S5 that the maximum value MaxΔCapacity(i) is smaller than the Off threshold value ThOff (S25: Yes), the control unit 131 sets MonitoringTime to zero (step S30). That is, the control unit 131 sets MonitoringTime=0.

When it is determined in step S23 that EnterLowTemperatureSum×⅖>MaxCapacitySum−ΣΔCapacity(i) is satisfied (S23: Yes), the control unit 131 assigns zero to MonitoringTime (step S32). In other words, the control unit 131 performs the process of MonitoringTime=0.

When it is determined in step S24 that ΣΔCapacity(i)−EnterMonitoringSum>ThChange1 or ΣΔCapacity(i)−EnterMonitoringSum<ThChange2 is satisfied (S24: Yes), the control unit 131 assigns zero to MonitoringTime (step S32). In other words, the control unit 131 performs the process of MonitoringTime=0.

After finishing the process in step S32, the process returns to step S8. In other words, when the total ΣΔCapacity(i) of the difference values changes or increases significantly, the state transitions to the state of On_LowTemperature. Returning to step S8, it is determined whether the latest sum difference value ΣΔCapacity(i) is larger than the maximum value (MaxCapacitySum) of the sum difference value ΣΔCapacity(i) up to the point.

First Modification

Figure 5:
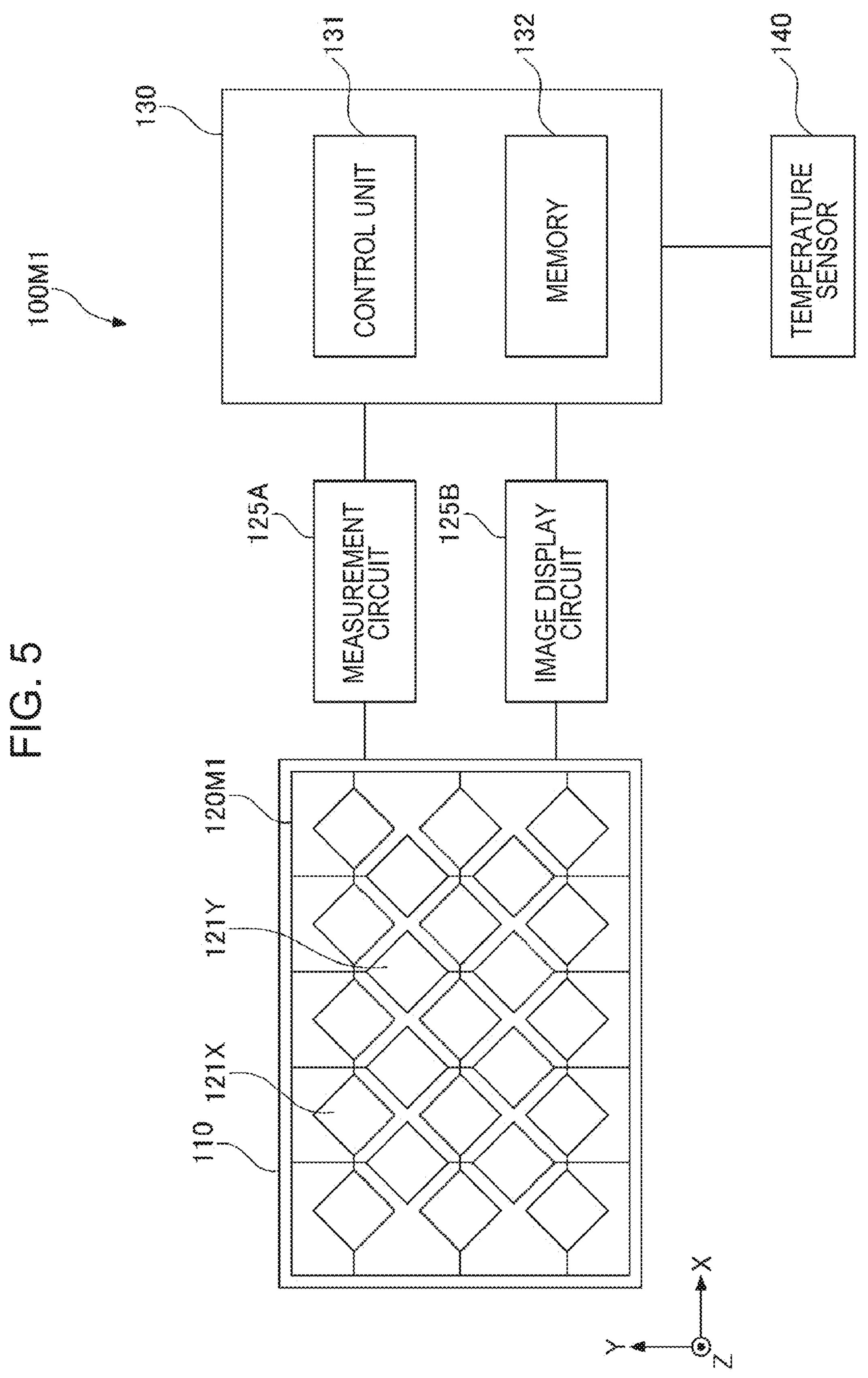
FIG. 5 is a diagram showing an example of the configuration of the electrostatic input device of the first modification of the embodiment.

FIG. 5 a diagram showing an example of the configuration of an electrostatic input device 100M1 of the first modification of the embodiment. The electrostatic input device 100M1 includes an electrostatic sensor 120M1 instead of the electrostatic sensor 120 of the electrostatic input device 100 shown in FIG. 2. The electrostatic sensor 120M1 has a plurality of electrostatic sensor electrodes 121X extending in the X direction and a plurality of electrostatic sensor electrodes 121Y extending in the Y direction. The measurement circuit 125A selects sequentially the plurality of electrostatic sensor electrodes 121X and the plurality of electrostatic sensor electrodes 121Y and measures the capacitance at the intersection points. The electrostatic sensor 120M1 can detect the contact position of the finger.

Second Modification

Figure 6:
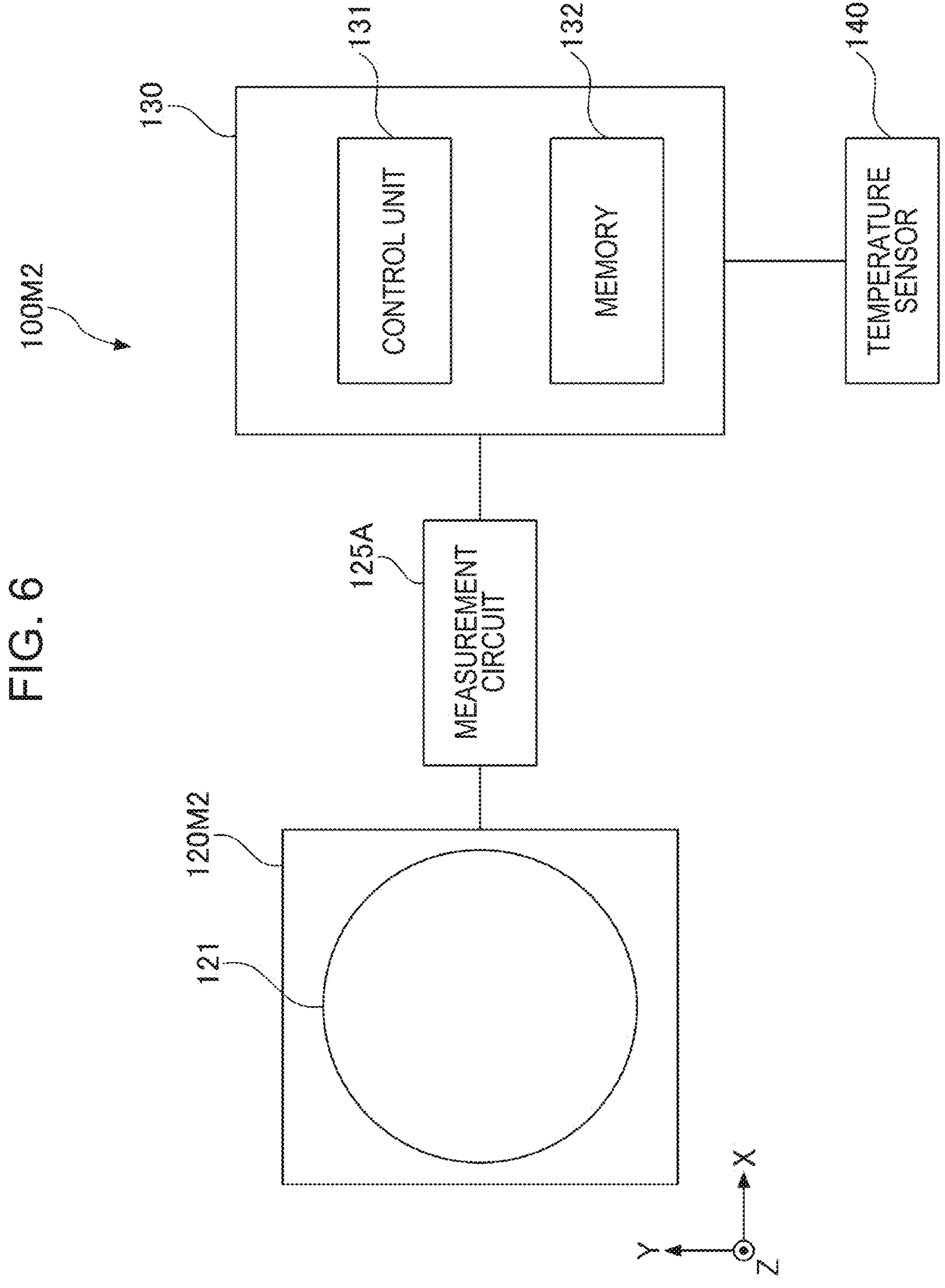
FIG. 6 is a diagram showing an example of the configuration of the electrostatic input device of the second modification of the embodiment.

FIG. 6 a diagram showing an example of the configuration of an electrostatic input device 100M2 of the second modification of the embodiment. The electrostatic input device 100M2 includes an electrostatic sensor 120M2 instead of the electrostatic sensor 120 of the electrostatic input device 100 shown in FIG. 2 and does not include the display 110. The electrostatic sensor 120M2 has only one electrostatic sensor electrode 121. The measurement circuit 125A measures the capacitance of the electrostatic sensor electrode 121. The present disclosure is applicable to such a single electrostatic sensor 120M2.

Effects

The electrostatic input device 100 includes the plurality of electrostatic sensor electrodes 121, the measurement circuit 125A that outputs a measurement value based on a capacitance between each of the plurality of electrostatic sensor electrodes 121 and an indication body, the control unit 131 that determines, based on the measurement value output by the measurement circuit 125A, whether a state is a proximity state in which the indication body is in proximity to the plurality of electrostatic sensor electrodes 121, and the memory 132 that stores as a reference value (Base) a measurement value in a state in which the indication body is not in proximity to the plurality of electrostatic sensor electrodes 121, wherein the control unit 131 determines whether a state is a proximity state based on the difference value ΔCapacity obtained by subtracting the reference value from a measurement value, calculates a sum difference value ΣΔCapacity(i) obtained by summing up a plurality of the difference values ΔCapacity of the plurality of electrostatic sensor electrodes 121, and when a state in which a fluctuation amount of the sum difference value ΣΔCapacity(i) is smaller than a predetermined value continues for a predetermined time or longer after the sum difference value ΣΔCapacity(i) decreases in the proximity state (S27: Yes), updates the reference value (S21, S28). Therefore, the reference value is promptly updated in a case where a state is erroneously determined to be proximity state due to the change in temperature of the electrostatic sensor electrode 121, even though the fingertip FT is away from the operation face 105A. In the related art, when the fluctuation amount of the sum difference value ΣΔCapacity(i) remains small for a long time, the reference value is updated. However, when the reference value is updated only in the state where the fluctuation amount of ΔCapacity(i) is small, the reference value may be updated with the finger touching the sensor face and not moving. Since the present invention combines the two states of "the sum difference value ΣΔCapacity(i) has decreased" and "the state in which the fluctuation amount of the sum difference value ΣΔCapacity(i) has remained smaller than a predetermined value continues for a predetermined time or longer", it is possible to suppress the updating of the reference value while the finger remains in contact with the sensor face and is not moved. In other words, the reference value can be updated promptly while suppressing malfunctions.

Therefore, it is possible to provide the electrostatic input device 100 that can suppress the updating of the reference value to the measurement value with the finger in contact with the sensor face, even when the finger is stopped with the finger in contact with the sensor face.

The control unit 131 may store the sum difference value ΣΔCapacity(i) when the sum difference value ΣΔCapacity(i) is highest in the memory 132 as the maximum sum difference value MaxCapacitySum (S8, S9), and may determine that the sum difference value ΣΔCapacity(i) has decreased when the second difference value MaxCapacitySum−ΣΔCapacity(i) obtained by subtracting the latest sum difference value ΣΔCapacity(i) from the maximum sum difference value MaxCapacitySum is larger than the decrease threshold value EnterLowTemperatureSum/2 (S11: Yes). Even in a case where the proximity state/non-proximity state cannot be accurately determined due to change in temperatures in the electrostatic sensor 120, the possibility that a finger has left the operation face 105A can be detected.

In a case where the temperature around the plurality of electrostatic sensor electrodes 121 is lower than the temperature threshold value (ThTemp) (S4), the control unit 131 may store the sum difference value ΣΔCapacity(i) at the time of determining that the state is a proximity state (S2) as the low temperature sum difference value EnterLowTemperatureSum in the memory 132 (S7), and the decrease threshold value EnterLowTemperatureSum/2 may be the first constant (½) times the low temperature sum difference value ΣΔCapacity(i). By using the relative value of the low temperature sum difference value EnterLowTemperatureSum, the decrease in the latest sum difference value ΣΔCapacity(i) can be appropriately determined regardless of temperature.

The control unit 131 may determines that the state is a proximity state in a case where any of the plurality of difference values ΔCapacity is larger than the proximity threshold value (Thon) (S2), the control unit 131 may determines that the state is a non-proximity state in a case where the plurality of difference values ΔCapacity is smaller than the non-proximity threshold value (ThOff) (S13), it is determined that the sum difference value ΣΔCapacity(i) has decreased in the proximity state (S11: Yes), then in a case where any of the plurality of difference values ΔCapacity exceeds the non-proximity threshold value (S13: No), the state transitions to the proximity monitoring state (On_Monitoring: S23), and in a case where the amount of increase in the sum difference value ΣΔCapacity(i) larger than a predetermined value in the proximity state, the control unit 131 may determines that the state is the proximity state (On) (S15: Yes). When the sum difference value ΣΔCapacity (i) increases, the fingertip FT is clearly touching the operation face 105A and the proximity state can be correctly determined by determining that the state is the proximity state.

The control unit 131 may determine that the sum difference value ΣΔCapacity(i) has increased when the second difference value MaxCapacitySum−ΣΔCapacity(i) is smaller than the increase threshold value. By using the second difference value MaxCapacitySum−ΣΔCapacity(i) between the maximum sum difference value MaxCapacitySum when the fingertip FT is touching the operation face 105A in the widest area and the latest sum difference value ΣΔCapacity(i), the amount of increase in the latest sum difference value ΣΔCapacity(i) can be accurately detected.

The increase threshold value may be the second constant times (⅖) the low temperature sum difference value ΣΔCapacity(i). By using the relative value of the low temperature sum difference value ΣΔCapacity(i), the proximity of the fingertip FT to the operation face 105A can be determined appropriately regardless of temperature.

The control unit 131 may determine that the state is a proximity state in a case where any of the plurality of difference values ΔCapacity is larger than the proximity threshold value (Thon) (S2), and may determine that the sum difference value ΣΔCapacity(i) has decreased in the proximity state (S11: Yes), and then in a case where the plurality of difference values ΔCapacity is less than the non-proximity threshold value (S13: Yes), the state may transition to the non-proximity monitoring state (Off Monitoring), and in a case where the sum difference value ΣΔCapacity(i) changes in the proximity monitoring state or non-proximity monitoring state, the state may transition to the proximity state. By determining that the fingertip FT is in proximity to the electrostatic sensor 120 in a case where the sum difference value ΣΔCapacity(i) changes, the contact of the fingertip FT to the operation face 105A can be properly determined.

The control unit 131 may cause the state to the proximity state in a case where the difference value obtained by subtracting the low temperature sum difference value ΣΔCapacity(i) from the sum difference value ΣΔCapacity(i) is larger than a positive first change constant, or in a case where the difference value obtained by subtracting the low temperature sum difference value ΣΔCapacity(i) from the sum difference value ΣΔCapacity(i) is smaller than a negative second change constant. By comparing the relative value of the low temperature sum difference value ΣΔCapacity(i) with a constant, the proximity of the fingertip FT to the operation face 105A can be properly determined.

The control unit 131 nay update the reference value when the non-proximity monitoring state continues longer than the first update time or the proximity monitoring state continues longer than the second update time, and the first update time may be shorter than the second update time. By making determination using separate and distinct threshold values (first update time and second update time) for the non-proximity monitoring state and proximity monitoring state, it is possible to determine the timing when the reference value should be updated correctly and early.

In the non-proximity monitoring state, when the sum difference value ΣΔCapacity(i) is smaller than a very small predetermined minimum threshold value (ThTiny), the control unit 131 may cause a state to transition to the non-proximity state without updating the reference value. This allows the reference value to be updated appropriately.

In addition, a temperature sensor that measures the temperature around the plurality of electrostatic sensor electrodes 121 may be further included, and in a case where the temperature around the plurality of electrostatic sensor electrodes 121 is lower than the temperature threshold value (ThTemp) (S4), the control unit 131 may perform a process of determining whether the state is the proximity state, and a process of calculating the sum difference value ΣΔCapacity(i) (i), and a process of updating the reference value. In a case where the fingertip begins to touch the operation face 105A at a low temperature, the temperature of the electrostatic sensor 120 may rise rapidly due to heating during operation. In addition, when the user continues to operate the device with a fingertip at a low temperature, the temperature of the electrostatic sensor 120 may rise rapidly due to body heat. By limiting the execution in a case where the fingertip begins to touch the operation face 105A at a low temperature, the timing at which the reference value is updated can be made appropriate.

In addition, if the reference value is lower than the low temperature reference value, the control unit may regard the reference value as a low temperature. The low temperature reference value is a value corresponding to the reference value at low temperatures (for example, 15° C.). The low temperature reference value is stored in the memory at the time of manufacture.

The control unit 131 may perform the process described above only in a case where the temperature at the time of the proximity state is lower than the predetermined value (S4). In a case where the temperature inside the vehicle is low when the state is the proximity state, the process described above is performed, so that it is possible to provide the electrostatic input device 100 capable of suppressing the erroneous determination that no proximity operation is being performed even when the finger is stopped while touching the sensor face and the updating to an incorrect reference value.

The electrostatic input device 100 includes the electrostatic sensor electrode 121, the measurement circuit 125A that outputs a measurement value based on a capacitance between the electrostatic sensor electrode 121 and an indication body, the control unit 131 that determines, based on the measurement value output by the measurement circuit 125A, whether a state is a proximity state in which the indication body is in proximity to the electrostatic sensor electrode 121, and the memory 132 that stores the measurement value in a state in which the indication body is not in proximity to the electrostatic sensor electrode 121 as a reference value, wherein the control unit 131 determines whether a state is the proximity state based on a difference value ΔCapacity obtained by subtracting the reference value from a measurement value, and updates the reference value when a state in which a fluctuation amount of the difference value ΔCapacity is smaller than a predetermined value continues for a predetermined time or longer after the difference value ΔCapacity decreases in the proximity state (S27: Yes). Therefore, the reference value is promptly updated in a case where a state is erroneously determined to be proximity state due to the change in temperature of the electrostatic sensor electrode 121, even though the fingertip FT is away from the operation face 105A.

Therefore, even when the sensitivity of the electrostatic sensor electrode 121 changes due to change in temperature and the like, the reference value can be updated promptly. Moreover, it is possible to provide the electrostatic input device 100 that can suppress the erroneous determination that the finger is away from the operation face even when the finger is stopped with the finger in contact with the operation face and the updating of the reference value to an incorrect value.

Although the electrostatic input device according to the exemplary embodiment of the present disclosure has been described above, the present disclosure is not limited to the specifically disclosed embodiments, but various modifications and changes are possible without deviation from the scope of the claims.

What is claimed is:

1. An electrostatic input device comprising:

a plurality of electrostatic sensor electrodes;

a measurement circuit configured to output a plurality of measurement values based on a capacitance between each of the plurality of electrostatic sensor electrodes and an indication body at a predetermined interval;

a processor configured to determine, based on the plurality of measurement values, a proximity state in which the indication body is in proximity to the plurality of electrostatic sensor electrodes; and a memory configured to store, as a reference value, a predetermined measurement value output from the measurement circuit, the reference value corresponding to a non-proximity state in which the indication body is not in proximity to the plurality of electrostatic sensor electrodes, wherein the processor is further configured to:

determine the proximity state based on a plurality of first difference values obtained by subtracting the reference value from, each of the plurality of measurement values;

calculate a plurality of sum difference values obtained by summing up the plurality of first difference values at the predetermined interval;

determine, in the proximity state, a first state in which a current sum difference value of the plurality of sum difference values decreases more than a first previous sum difference value of the plurality of sum difference values;

determine, in the proximity state, whether a fluctuation amount of the plurality of sum difference values is smaller than a predetermined value after the processor determines that the current sum difference value decreases more than the first previous sum difference value;

determine, in the proximity state, whether a second state, in which the fluctuation amount of the plurality of sum difference values is smaller than the predetermined value, continues for a predetermined time or more;

update the reference value to an updated reference value under conditions below:

the processor determines, in the proximity state, the first state at a first time; and the processor determines that the second state continues for the predetermined time or more from the first time; and determine the proximity state based on a plurality of second difference values obtained by subtracting the updated reference value from each of the plurality of measurement values.

2. The electrostatic input device according to claim 1, wherein the processor is further configured to:

cause the memory to store a highest value of the plurality of sum difference values as a maximum sum difference value; and determine the first state under a condition in which a third difference value, obtained by subtracting the current sum difference value from the maximum sum difference value, is larger than a decrease threshold value.

3. The electrostatic input device according to claim 2, wherein the processor is further configured to cause the memory to store one of the plurality of sum difference values in the proximity state as a low temperature sum difference value under a condition below:

a temperature around the plurality of electrostatic sensor electrodes is lower than a temperature threshold value, and the decrease threshold value is obtained by multiplying the low temperature sum difference value by a first constant.

4. The electrostatic input device according to claim 3, wherein the processor is further configured to:

determine the proximity state under a condition below:

any of the plurality of first difference values is larger than a proximity threshold value; and determine the non-proximity state under a condition below:

each of the plurality of first difference values is smaller than a non-proximity threshold, value;

transition to a proximity monitoring state under conditions below:

the processor determines, in the proximity state, the first state at the first time; and the processor determines that any of the plurality of first difference values is larger than the non-proximity threshold value from the first time;

transition to a non-proximity monitoring state under conditions below:

the processor determines, in the proximity state, the first state at the first time; and the processor determines that each of the plurality of first difference values is lower than the non-proximity threshold value from the first time; and determine, in the proximity monitoring state or in the non-proximity monitoring state, the proximity state under a condition in which an increase amount between the current sum difference value of the plurality of sum difference values and a second previous sum difference value of the plurality of sum difference values is larger than a predetermined increase amount.

5. The electrostatic input device according to claim 4, wherein the processor is further configured to determine that the increase amount exists under a condition in which the third difference value is smaller than an increase threshold value.

6. The electrostatic input device according to claim 5, wherein the increase threshold value is obtained by multiplying the low temperature sum difference value by a second constant.

7. The electrostatic input device according to claim 5, wherein the processor is further configured to, in the proximity monitoring state, transition to the proximity state under a condition in which the current sum difference value of the plurality of sum difference values is changed from a third previous sum difference value of the plurality of sum difference values.

8. The electrostatic input device according to claim 7, wherein the processor is further configured to:

calculate a fourth difference value by subtracting the low temperature sum difference value from one of the plurality of sum difference values; and transition to the proximity state under conditions below:

the fourth difference value is larger than a positive first change constant; or the fourth difference value is smaller than a negative second change constant.

9. The electrostatic input device according to claim 8, wherein the processor is configured to update the reference value to the updated reference value under further conditions below:

the non-proximity monitoring state continues longer than a first update time; or the proximity monitoring state continues longer than a second update time, and the first update time is shorter than the second update time.

10. The electrostatic input device according to claim 8, wherein the processor is further configured to, in the non-proximity monitoring state, transition to the non-proximity state without updating the reference value to the updated reference value under a condition below:

one of the plurality of sum difference values is smaller than a predetermined minimum threshold value.

11. The electrostatic input device further comprising:

a temperature sensor configured to measure a temperature around the plurality of electrostatic sensor electrodes, wherein the processor is configured to perform the processes defined in claim 1 under conditions below:

the processor determines the proximity state; and the temperature around the plurality of electrostatic sensor electrodes is lower than a temperature threshold value.

12. The electrostatic input device according to claim 1 wherein the processor is further configured to:

determine whether the reference value is smaller than a corresponding reference value in a predetermined temperature condition lower than a regular temperature condition; and perform the processes defined in claim 1 under conditions below:

the processor determines the proximity state; and the processor determines that the reference value is smaller than the corresponding reference value in the predetermined temperature condition.

13. An electrostatic input device comprising:

an electrostatic sensor electrode;

a measurement circuit configured to output a plurality of measurement values based on a capacitance between the electrostatic sensor electrode and an indication body at a predetermined interval;

a processor configured to determine, based on the plurality of measurement values, a proximity state in which the indication body is in proximity to the electrostatic sensor electrode; and a memory configured to store, as a reference value, a predetermined measurement value output from the measurement circuit, the reference value corresponding to a non-proximity state in which the indication body is not in proximity to the electrostatic sensor electrode, wherein the processor is further configured to:

determine the proximity state based on a plurality of first difference values obtained by subtracting the reference value from each of the plurality of measurement values;

determine, in the proximity state, a first state in which a current first difference value of the plurality of first difference values decreases more than a previous first difference value of the plurality of first difference values;

determine, in the proximity state, whether a fluctuation amount of the plurality of first difference values is smaller than a predetermined value after the processor determines that the current first difference value decreases more than the previous first difference value;

determine, in the proximity state, whether a second state, in which the fluctuation amount of the plurality of first difference values is smaller than the predetermined value, continues for a predetermined time or more;

update the reference value to an updated reference value under conditions below:

the processor determines, in the proximity state, the first state at a first time; and the processor determines that the second state continues for the predetermined time or more from the first time; and determine the proximity state based on a plurality of second difference values obtained by subtracting the updated reference value from each of the plurality of measurement values.

* * * * *